Patented Feb. 16, 1932

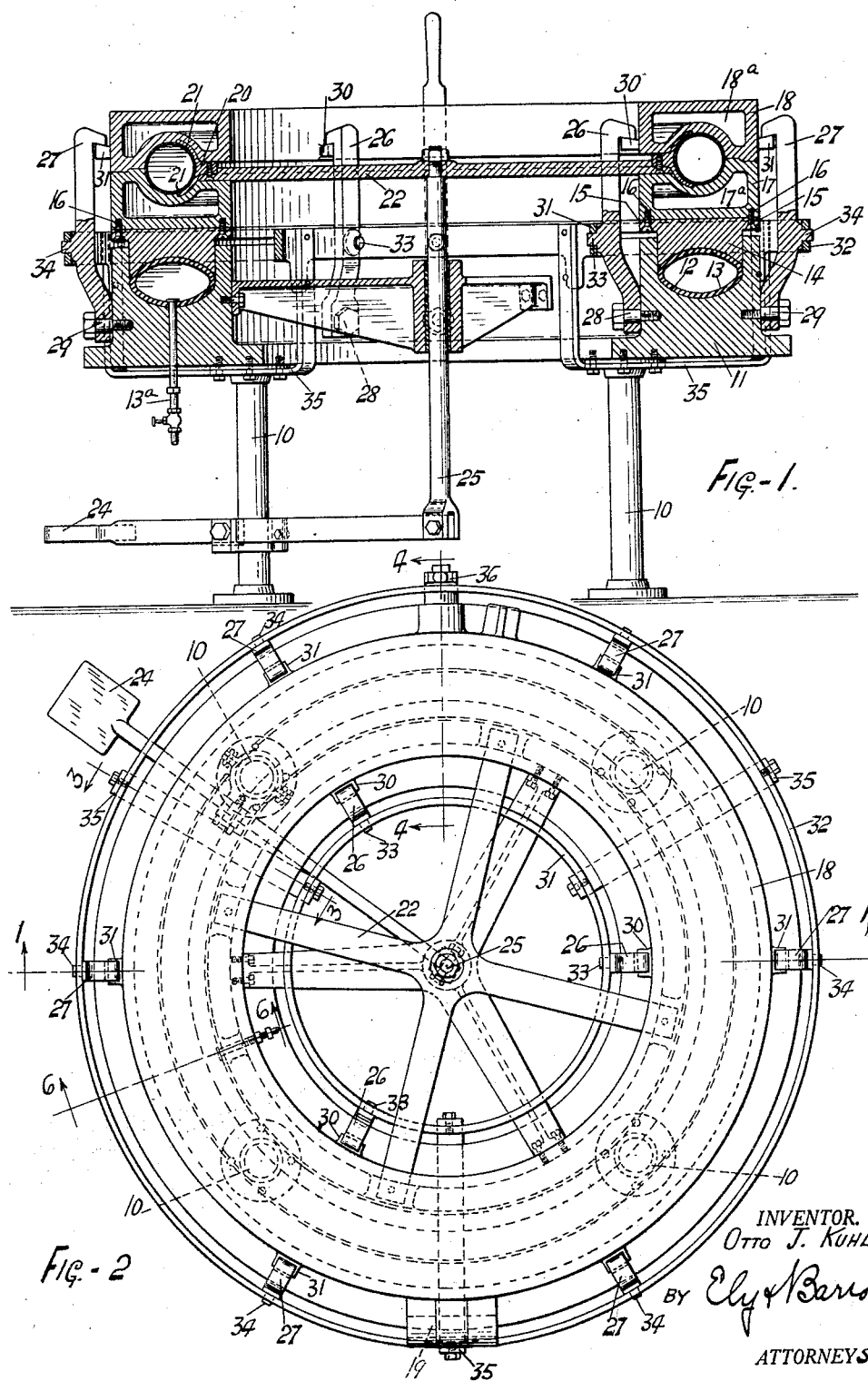

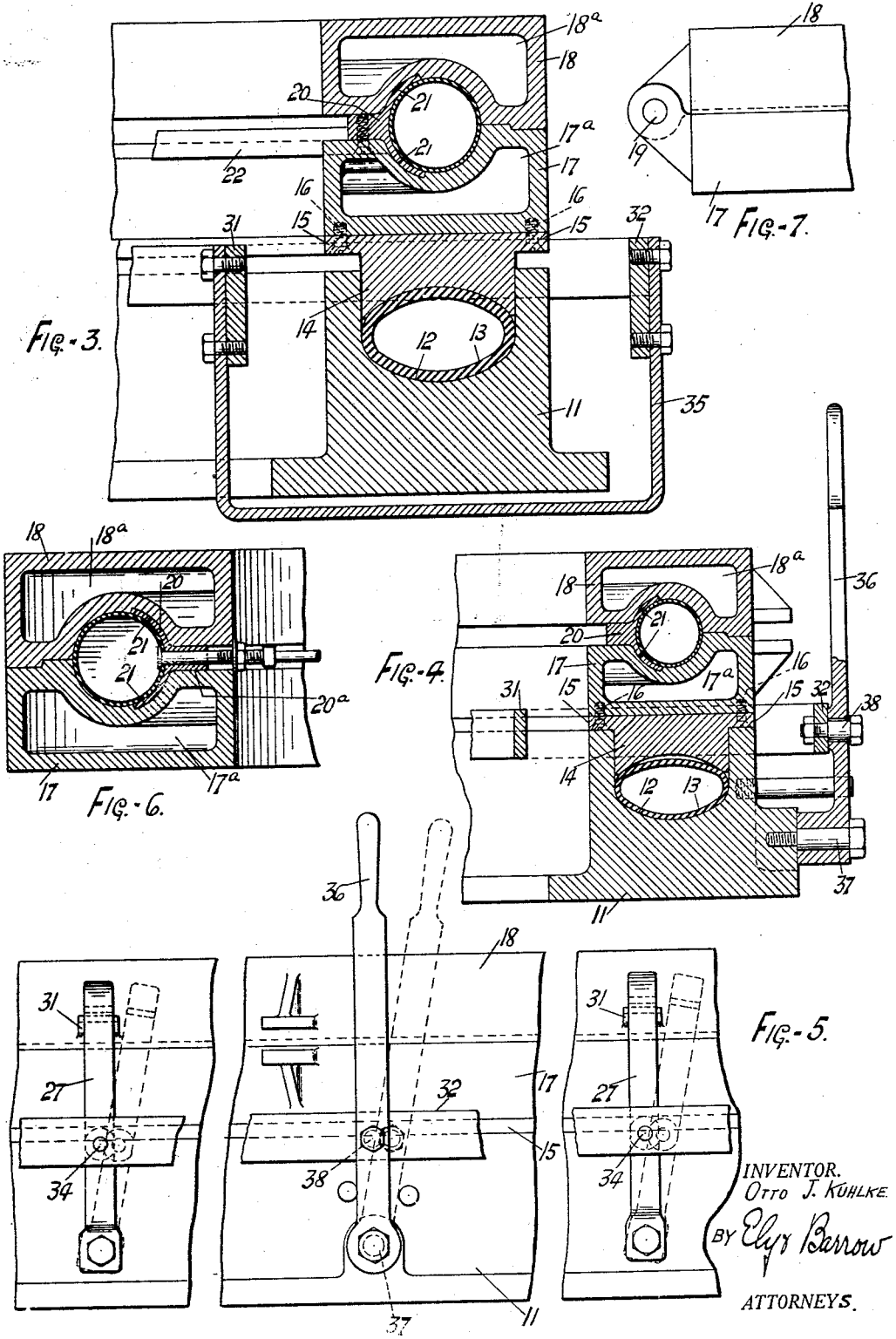

1,844,962

UNITED STATES PATENT OFFICE

OTTO J. KUHLKE, OF AKRON, OHIO, ASSIGNOR, BY MESNE ASSIGNMENTS, TO NATIONAL RUBBER MACHINERY COMPANY, OF AKRON, OHIO, A CORPORATION OF OHIO

VULCANIZER

Application filed November 22, 1927. Serial No. 234,989.

This invention relates to apparatus for vulcanizing rubber articles and particularly tires.

The general purpose of the invention is to provide a type of vulcanizer in which inner tubes or tires may be individually vulcanized in an economical and efficient manner.

More particularly the invention has for its object the provision of improved jacketed mold vulcanizers in which a greatly simplified, quick-acting means is arranged for applying pressure to the mold halves to secure them together during vulcanization.

A further object of the invention is to provide, in combination with a vulcanizing mold for tires or the like, of means for facilitating positioning of the article therein for vulcanization and for ejecting the completed article from the mold.

The foregoing and other objects are attained in the construction illustrated in the accompanying drawings and described below. It is to be understood that the invention is not limited to the particular form thereof shown and described.

Of the accompanying drawings,

Figure 1 is a diametral section on line 1—1 of Figure 2 of a vulcanizer embodying the invention;

Figure 2 is a plan thereof;

Figure 3 is an enlarged radial section on line 3—3 of Figure 2;

Figure 4 is an enlarged radial section on line 4—4 of Figure 2;

Figure 5 is an enlarged detail right elevation of the portion of the apparatus shown in Figure 4;

Figure 6 is a section of the mold on line 6—6 of Figure 2; and

Figure 7 is an elevation of the hinge between the mold halves.

Referring to the drawings, the numerals 10, 10 designate supporting legs on which is mounted an annular bed or base member 11 having an annular cavity 12 opening in the upper face thereof in which is arranged a pressure bag 13 for operating a platen 14. Platen 14 rests upon bag 13 which has an inflating connection 13ª, and the platen is guided during movement thereof by the bag by engagement with the side walls of cavity 12. The platen 14 is provided with circumferential flanges 15, 15 adapted to engage upon and support the platen upon the upper surface of the base member when the pressure in bag 13 is released. These flanges also provide means through which screws or other suitable fastenings may be inserted as shown at 16, 16 so as removably to support molds thereon.

The molds comprise lower sections 17 and upper sections 18 which may be hinged together at 19 so as to be swung from and to the mating relationship shown for removing and inserting the articles vulcanized by the apparatus. The mold sections are provided with circumferential cavities at 17ª and 18ª into which a suitable heating medium may be introduced in the usual way, the usual supply and drain connections (not shown) being made thereto.

In order to facilitate placement of the articles in the molds and also ejectment of the vulcanized articles therefrom, an article supporting ring 20 is arranged to extend between the mold halves, this ring, when used in inner tube vulcanizing apparatus, as shown, having a groove in its periphery, in which the tube is seated and its upper and lower surfaces being shaped to fit in depressions indicated at 21, 21 in the mold walls whereby the surface of the groove is continuous with the mold surfaces. Ring 20 is removably mounted upon a supported spider 22 which is arranged to be moved vertically relatively to the lower mold section by means of a pedal lever 24 connected to the spider 22 by a link 25.

For providing abutments to be engaged by the molds so that the pressure of platen 14 may be applied thereto during vulcanization, inner and outer circumferential series of hooks shown respectively, at 26, 26 and 27, 27, are swiveled upon the base member 11 as respectively indicated at 28, 28 and 29, 29 and are arranged to be simultaneously actuated to or from positions in alignment with lugs 30, 30 and 31, 31 respectively, upon the inner and outer peripheries of the upper mold section.

Suitable mechanism for operating hooks 26 and 27 consists in inner and outer rings 31 and 32 to which hooks 26 and 27 are swiveled at 33 and 34, rings 31 and 32 being connected together by U-shaped elements 35, 35 embracing the base member 11 between legs 10, 10 whereby they may be simultaneously operated by a single means. A lever 36, pivoted at 37 on the base 11 has a loose pivotal connection at 38 to outer ring 32 for actuating rings 31 and 32 in either direction.

In use for vulcanizing inner tubes, the mold is opened and positioning ring 20 is lifted out of the lower mold half 17 by depressing pedal 24 to receive the raw, partly inflated tube therein, the valve of the tube being inserted through aperture 20ª in the positioning ring and connected to a source of air or other suitable fluid pressure. The ring 20 is then lowered into place on the lower mold half 17, the upper mold half 18 is swung into place, hooks 27 being in the dotted line position shown in Figure 5, and pressure tube 13 being deflated as shown in Figure 4.

Lever 36 is now actuated to swing the hooks 26 and 27 into engagement with the lugs 30 and 31 on the upper mold section and fluid under pressure is supplied to the tube 13 to force the mold halves together between hooks 26 and 27 and platen 14. The inner tube is then inflated against the surfaces of the mold. The mold is maintained at vulcanizing temperature at all times by continuous circulation of steam or other medium through the hollow mold halves. The inner tube is accordingly left in the mold for the required time of vulcanization.

Upon ending of the vulcanization period, the pressure in the inner tube and then in tube 13 are relieved and the lever 36 is actuated to disengage hooks 26 and 27 from lugs 30 and 31. The mold is then opened, foot lever 24 is depressed to elevate the ring 20 out of the mold with the completed tube thereon, the ring 20 facilitating breaking of any adhesion of the tube to the mold. The tube inflating connections are then released and the tube removed from the ring 20, another raw tube being mounted thereon ready for a succeeding vulcanizing operation.

It will of course be apparent that the tube positioning ring 20 by reason of the heating of the jacketed sections during the use of the vulcanizer, will remain substantially at vulcanizing temperature at all times. The heat thereof accordingly warms and softens the inner peripheral portion of the tube during the short interval between mounting of the tube on the ring and closing of the vulcanizer, which releases the inherent tension of the rubber in this portion of the tube and allows the contained air to extend the outer peripheral portion of the tube therefrom, whereby all puckers on the inner periphery of the tube are eliminated before the vulcanization proceeds. This is an important feature of the ring 20, especially when it is considered that the tubes are usually initially formed in straight lengths, the ends of which are brought together and spliced to make the endless raw tube, which of course, puckers the rubber to some extent on the inner periphery of the tube. Also, due to the fact that the sides of the tube are prevented from contacting with the sides of the mold by the ring 20 until the vulcanizer is closed, localized heating of the sides of the tube and resulting squirming of the tube in the mold is obviated.

It will appear from the foregoing that a simple but very effective vulcanizing apparatus has been provided for vulcanizing inner tubes or other rubber articles. It is also obvious that modifications of this invention may be resorted to without departing from the spirit thereof or the scope of the appended claims.

What is claimed is:

1. Vulcanizing apparatus comprising an annular base member, an annular platen thereon, an annular, inflatable pressure bag for raising and lowering said platen, an annular vulcanizing mold on said platen comprising separable members, and means for engaging the upper mold member to hold it under pressure of the platen on the mold comprising inner and outer series of hooks pivoted on the base member and engageable with lugs respectively on the inner and outer peripheries of the upper mold member, and means for shifting the hooks to and from engagement with the lugs comprising rings connecting the hooks of each series, connections between the rings, and a lever connected with one of the rings to simultaneously actuate the hooks to and from engagement with the lugs.

2. Vulcanizing apparatus comprising an annular base member, an annular platen thereon, an annular, inflatable pressure bag for raising and lowering said platen, an annular vulcanizing mold on said platen comprising separable members, and means for engaging the upper mold member to hold it under pressure of the platen on the mold comprising inner and outer series of hooks pivoted on the base member and engageable with lugs respectively on the inner and outer peripheries of the upper mold member, and means for shifting the hooks to and from engagement with the lugs.

3. Vulcanizing apparatus comprising an annular base member, an annular platen thereon, an annular, inflatable pressure bag for raising and lowering said platen, an annular vulcanizing mold on said platen comprising separable members, and means for engaging the upper mold member to hold it under pressure of the platen on the mold comprising inner and outer series of hooks pivoted on the base member and engageable with lugs respectively on the inner and outer peripheries of the upper mold member, and means for simultaneously shifting the hooks to and from engagement with the lugs.

4. Vulcanizing apparatus comprising an annular base member, an annular platen thereon, means for raising and lowering said platen, an annular vulcanizing mold on said platen comprising separable members, and means for engaging the upper mold member to hold it under pressure of the platen on the mold comprising inner and outer series of hooks pivoted on the base member and engageable with lugs respectively on the inner and outer peripheries of the upper mold member, and means for shifting the hooks to and from engagement with the lugs comprising rings connecting the hooks of each series, connections between the rings, and a lever connected with one of the rings to simultaneously actuate the hooks to and from engagement with the lugs.

5. Vulcanizing apparatus comprising an annular base member, an annular platen thereon, means for raising and lowering said platen, an annular vulcanizing mold on said platen comprising separable members, and means for engaging the upper mold member to hold it under pressure of the platen on the mold comprising inner and outer series of hooks pivoted on the base member and engageable with lugs respectively on the inner and outer peripheries of the upper mold member, and means independent of the platen raising and lowering means for shifting the hooks to and from engagement with the lugs.

6. Vulcanizing apparatus comprising an annular base member, an annular platen thereon, means for raising and lowering said platen, an annular vulcanizing mold on said platen comprising separable members, and means for engaging the upper mold member to hold it under pressure of the platen on the mold comprising inter-connected inner and outer series of hooks pivoted on the base member and engageable with lugs respectively on the inner and outer peripheries of the upper mold member, and means for simultaneously shifting the hooks to and from engagement with the lugs.

7. Vulcanizing apparatus comprising a base member, a platen thereon, an inflatable pressure bag for raising and lowering said platen, a vulcanizing mold on said platen comprising separable members, and means for engaging the upper mold member to hold it under pressure of the platen on the mold, comprising a series of hooks pivoted on the base member and engageable with lugs on the outer periphery of the upper mold member, and means for shifting the hooks to and from engagement with the lugs.

8. Vulcanizing apparatus comprising a base member, a platen thereon, an inflatable pressure bag for raising and lowering said platen, a vulcanizing mold on said platen comprising separable members, and means for engaging the upper mold member to hold it under pressure of the platen on the mold comprising a series of hooks pivoted on the base member and engageable with lugs on the upper mold member, and means for simultaneously shifting the hooks to and from engagement with the lugs.

9. Vulcanizing apparatus comprising a base member, a platen thereon, means for raising and lowering said platen a vulcanizing mold on said platen comprising separable members, and means for engaging the upper mold member to hold it under pressure of the platen on the mold comprising a series of hooks pivoted on the base member, and engageable with lugs on the upper mold member, and means for shifting the hooks to and from engagement with the lugs comprising rings connecting the hooks of each series, connections between the rings, and a lever connected with one of the rings to simultaneously actuate the hooks to and from engagement with the lugs.

10. Vulcanizing apparatus comprising a base member, a platen thereon, means for raising and lowering said platen, a vulcanizing mold on said platen comprising separable members, and means for engaging the upper mold member to hold it under pressure of the platen on the mold comprising an inner and outer series of hooks pivoted on the base member, and engageable with inner and outer lugs on the upper mold member, and means independent of the platen raising and lowering means for shifting the hooks to and from engagement with the lugs.

11. Vulcanizing apparatus comprising a base member, a platen thereon, means for raising and lowering said platen, a vulcanizing mold on said platen comprising separable members, and means for engaging the upper mold member to hold it under pressure of the platen on the mold comprising a series of hooks pivoted on the base member and engageable with outer peripheral lugs on the upper mold member, and means independent of the platen raising and lowering means for simultaneously shifting the hooks to and from engagement with the lugs.

12. The combination with vulcanizing apparatus for annular objects, said apparatus comprising separate annular mold members, of an article positioning and ejecting ring mounted between the mold members and adapted to receive the objects on its outer periphery, said ring fitting substantially entirely within depressions in the mold surfaces, and a single axial means for translating said ring from or toward one of said mold members when said mold members are separated.

13. Apparatus for vulcanizing inner tubes comprising separable annular mold members, a tube-positioning ring constituting a unitary structure having a peripheral groove adapted to receive the tube therein, said ring being constructed to fit between and interiorly of the mold members and being movable relative to one mold member when the mold members are separated, and a single means for translating said ring away from said mold member.

14. Apparatus for vulcanizing inner tubes comprising separable annular mold members, and a unitary tube-positioning ring having a peripheral groove adapted to receive the tube therein, said ring being constructed to fit between and interiorly of the mold members, and a single means for translating the ring to and from engagement with one mold member when the mold members are separated.

15. Apparatus for vulcanizing inner tubes in endless form, said apparatus including mating upper and lower heated mold sections relatively movable between open and closed positions, a unitary ring adapted to receive and support a partly inflated inner tube thereon by engagement with the inner peripheral portion of said tube, said ring being arranged between and interiorly of said mating mold sections and adapted to cooperate therewith when the vulcanizer is closed to vulcanize the inner peripheral portion of the tube, said ring being adapted to conduct heat from said sections to the tube during vulcanization and to retain heat therein during continued use of the apparatus, and means for relatively moving said ring to and from a position spaced from said sections when the vulcanizer is open.

OTTO J. KUHLKE.